United States Patent [19]

Sato

[11] Patent Number: 4,626,496

[45] Date of Patent: Dec. 2, 1986

[54] OPTICAL INFORMATION RECORDING MEDIUM

[75] Inventor: Tsutomu Sato, Yokohama, Japan

[73] Assignee: Ricoh Co., Ltd., Tokyo, Japan

[21] Appl. No.: 745,344

[22] Filed: Jun. 14, 1985

[30] Foreign Application Priority Data

Jun. 19, 1984 [JP] Japan ................................ 59-124470
Jun. 19, 1984 [JP] Japan ................................ 59-124471

[51] Int. Cl.⁴ .............................................. G03C 5/24
[52] U.S. Cl. ................................... 430/270; 430/271; 430/945; 430/935; 430/495
[58] Field of Search ............... 430/270, 945, 935, 271, 430/495; 369/109, 275

[56] References Cited

U.S. PATENT DOCUMENTS 4,465,767  8/1984  Oba et al. ......................... 430/945

FOREIGN PATENT DOCUMENTS

0147083A2  3/1985  European Pat. Off. .
59-67092   4/1984  Japan ................................ 430/495
59-78341   5/1984  Japan ................................ 430/495

Primary Examiner—Won H. Louie
Attorney, Agent, or Firm—Flynn, Thiel, Boutell & Tanis

[57] ABSTRACT

The present invention provides an optical information recording medium comprising, on a substrate, a recording layer consisting essentially of a double salt of an organic dye cation and a metal complex anion or a recording layer consisting essentially of said double salt and an organic dye.

31 Claims, 6 Drawing Figures

OPTICAL INFORMATION RECORDING MEDIUM

BACKGROUND OF THE INVENTION (a) Field of the Invention

The present invention relates to an optical information recording medium having a recording layer containing a specific double salt or a recording layer containing said specific double salt and an organic dye. In more detail, the present invention relates to an optical information recording medium for use in a method of directly recording and regenerating information with a laser beam.

(b) Description of the Prior Art

A method of recording and regenerating information by radiating a laser beam on a rotating disk-shaped optical information recording medium has hitherto been known. As the optical information recording medium for use in this method there has been proposed the one which comprises providing on, a substrate, a thin layer of a low melting metal or a mixed thin layer of this metal and a dielectric substance. However, the optical information recording medium of this sort is disadvantageous in respect of inferior preservability, low resolving power, low recording density, high production cost and the like. In recent years, further, it has been proposed to use an organic dye thin film, whose physical properties are changeable upon exposure to a relatively long wavelength light such as a semiconductor laser beam, for a recording layer. This organic dye thin film surely can eliminate the above defects, but involves the problems that the organic dye, which has absorptivity on the long wavelength side, is generally inferior in stability against heat and light when used singly, and the like. In view of this, it has been proposed to incorporate a metal complex in an organic thin film recording layer. However, the fact is that only the mixture of the organic dye and the metal complex as mentioned above can not attain sufficient recording and regenerating characteristics.

SUMMARY OF THE INVENTION

The present invention has been accomplished in light of the above mentioned existing state of the art, and aims at provision of an optical information recording medium which is capable of recording and regenerating with a long wavelength light, such as a semi-conductor laser beam, which is superior in preservability, exhibits little regenerative deterioration and is high in recording density.

I have devoted myself to study in order to achieve the above mentioned object to find that a double salt of an organic dye cation and a metal complex anion or a mixture of this double salt and an organic dye is usable as a stable recording material. The present invention has been completed on the basis of this finding.

The object of the present invention is to provide an optical information recording medium which is characterized by providing, on a substrate, (1) a recording layer consisting essentially of a double salt of an organic dye cation and a metal complex anion or (2) a recording layer consisting essentially of said double salt and an organic dye.

As the general methods of preparing the double salt used in the recording layers (1) and (2) of the present invention there can be enumerated the following ones.

1. Method utilizing the difference in solubility (a) Crystallization of double salt:

The solution of a compound comprising an organic dye cation and its counter ion and the solution of a compound comprising a metal complex anion and its counter ion were mixed for crystallizing a double salt of an organic dye cation and a complex anion. At this time, the mixed solution may be concentrated or cooled as occasion demands. The counter ions to be used preferably should be high in solubility. As the solvent may be enumerated a single solvent, a bad solvent for use in the double salt or a good solvent for use in the counter ion.

Another salt may be added to thereby salt out the solution for the purpose of accelerating the crystallization.

(b) Crystallization of the one counter ions with another counter ions:

Contrary to the case of the preceding (a), the one counter ions may be crystallized with another counter ions for obtaining a double salt of an organic dye cation and a complex anion as precipitate. In this instance, there may also be used the same solvent as in the preceding (a) such as a single solvent, a bad solvent for the double salt or a good solvent for the counter ion.

Another salt may be added to thereby salt out the solution for the purpose of accelerating the crystallization of the same kind counter ions.

2. Method using ion-exchange resins:

(a) Preparation of double salt using cation exchange resins:

An organic dye cation is adsorbed on a cation exchange resin. A metal complex solution is passed through same for ion exchange, thereby resulting in a double salt.

(b) Preparation of double salt using anion exchange resins:

A metal complex anion is adsorbed on an anion exchange resin. An organic dye solution is passed through same for ion exchange, thereby resulting in a double salt.

In preparing the double salt of the present invention by the above methods, it is necessary to use a compound comprising an organic dye cation and its counter ion as one ion source, and use a compound comprising a metal complex anion and its counter ion as the other ion source. As the typical examples of said organic dye cation can be enumerated those shown hereinafter.

(1) Polymethine dye cations:
Examples:

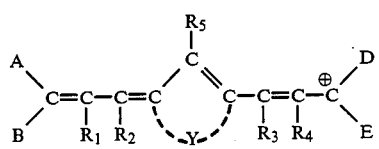

(I)

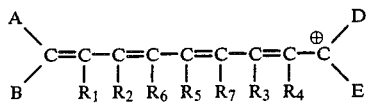

(II)

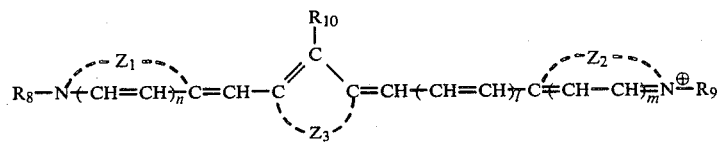

(III)

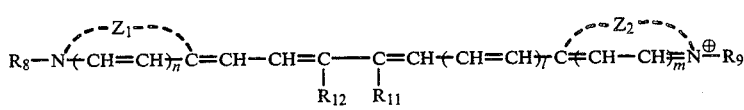

(IV)

In the above formulas (I)–(IV), however, A, B, D and E each stands for a substituted or unsubstituted aryl group; $R_1$, $R_2$, $R_3$, $R_4$, $R_5$, $R_6$ and $R_7$ may be same or different, and each stands for a hydrogen atom, a halogen atom or an alkyl group; Y stands for a dihydric residue having an atomic group required for completing a pentacyclic ring or a hexacyclic ring; $R_8$ and $R_9$ may be same or different, and each stands for a substituted or unsubstituted alkyl group or a substituted or unsubstituted aralkyl group or alkenyl goup; $Z_1$ and $Z_2$ each stands for an atomic group required for completing a substituted or unsubstituted heterocyclic ring; $Z_3$ stands for an atomic group required for completing a substituted or unsubstituted pentacyclic ring or hexacyclic ring, and said pentacyclic ring or hexacyclic ring may be condensed with an aromatic ring; $R_{10}$ stands for a hydrogen atom or a halogen atom; $R_{11}$ and $R_{12}$ each stands for a hydrogen atom, a halogen atom, a hydroxy group, a carboxyl group, an alkyl group, or a substituted or unsubstituted aryl group or acryloxy; and l, m and n each is 0 or 1.

(2) Triaryl methane dye cations:
Examples:

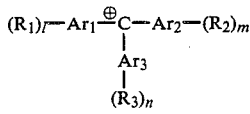

(V)

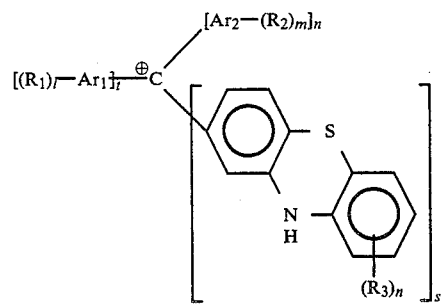

(VI)

In the above formulas (V) and (VI), however, $R_1$, $R_2$ and $R_3$ may be same or different, and each stands for a hydrogen atom, a hydroxy group, a halogen atom, a $C_1$-$C_{20}$ alkyl group or —N($C_1$-$C_{10}$ alkyl)$_2$; l, m and n each stands for an integer of 0 or 1–9; $Ar_1$, $Ar_2$ and $Ar_3$ may be same or different, and each stands for a substituted or unsubstituted aryl group; s, t and u each stands for 0 or 1–3; and s+t+u=3.

(3) Pyrylium dye cations:

Examples:

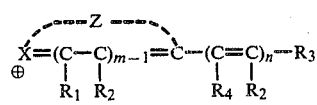

(VII)

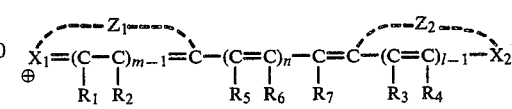

(VIII)

In the above formulas (VII) and (VIII), however, X, $X_1$ and $X_2$ each stands for a sulfur atom, an oxygen atom or a selenium atom; Z and $Z_1$ each stands for a hydrocarbon group comprising an atomic group required for completing pyrylium, thiopyrylium, selenapyrylium, benzopyrylium, benzothiopyrylium, benzoselenapyrylium, naphthopyrylium, naphthothiopyrylium or naphthoselenapyrylium which may have been substituted; $Z_2$ stands for a hydrocarbon group comprising an atomic group required for completing pyran, thiopyran, selenapyran, benzopyran, benzothiaopyran, benzoselenapyran, naphthopyran, naphthothiopyran or naphthoselenapyran which may have been substituted; $R_1$, $R_2$, $R_3$ and $R_4$ each stands for a hydrogen atom, a substituted or unsubstituted alkyl group or a substituted or unsubstituted aryl group; $R_5$, $R_6$ and $R_7$ each stands for a hydrogen atom, a halogen atom, a substituted or unsubstituted alkyl group, a substituted or unsubstituted aryl group or a substituted or unsubstituted aralkyl group; m and l each stands for 1 or 2; and n stands for 0, 1 or 2.

(4) Phenanthrene dye cations:
Examples:

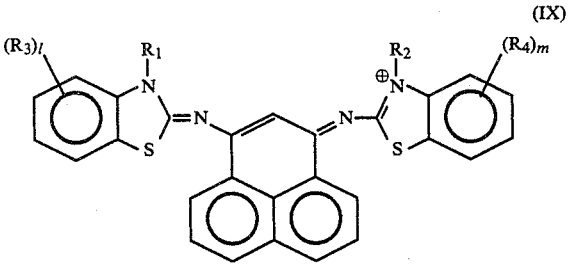

(IX)

-continued

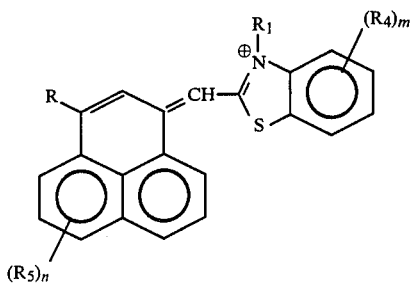 (X)

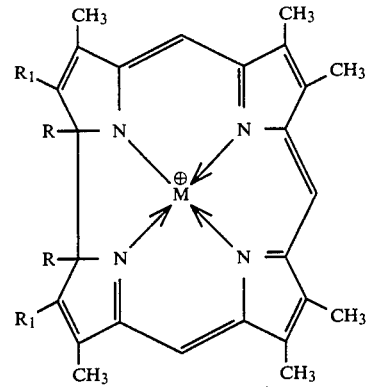 (XI)

In the above formulas (IX) and (X), however, $R_1$ and $R_2$ each stands for an alkyl group; $R_3$, $R_4$ and $R_5$ each stands for a hydrogen atom, a hydroxy group, a halogen atom, a substituted or unsubstituted alkyl, aryl, aralkyl, amino or alkoxy group; R stands for

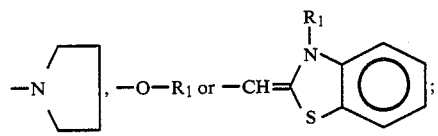

and l m and n each stands for 0 or 1-6.

(5) Tetrahydrocholine dye cations:

Examples:

wherein, R stands for an alkyl group or a carboalkoxy group such, for instance, as $COOC_2H_5$; and M stands for H, Ni(II), Co(II), Co(III) or the like.

(6) Triarylamine dye cations:

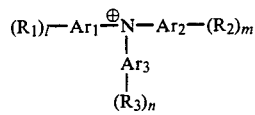 (XII)

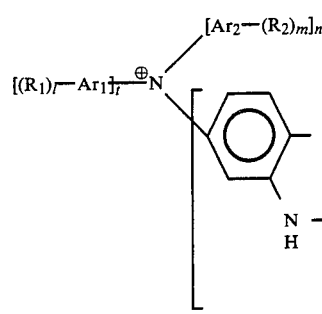 (XIII)

In the above formulas (XII) and (XIII), however, $R_1$-$R_3$, l, m, n, $Ar_1$-$Ar_3$, s, t and u imply the same ones as defined in the formulas (V) and (VI).

The counter ions against the above mentioned organic dye cations include acid anions such, for instance, as chloride ion, bromide ion, iodide ion, perchlorate ion, benzensulfonate ion, p-toluene-sulfonate ion, methylsulfate ion, ethylsulfate ion, propylsulfate ion and the like.

The typical examples of the compounds, which can be used in the preparation of double salts according to the present invention and comprise the above mentioned organic dye cations constituting one ion source (organic dye cations) and their counter ions, are given in the following table. However, the present invention should not limited to these alone.

| Compound No. | A | B | D | E | R₁ | R₂ | R₃ | R₄ | R₅ | Y | X⊖ |
|---|---|---|---|---|---|---|---|---|---|---|---|
| Formula (I) | | | | | | | | | | | |
| -1 | Ph | Ph | Ph | Ph | H | H | H | H | H | -CH₂CH₂CH₂- | ClO₄ |
| -2 | ″ | ″ | ″ | ″ | H | H | H | H | H | -CH₂CH₂- | ClO₄ |
| -3 | 4-N(CH₃)₂-C₆H₄ | 4-N(CH₃)₂-C₆H₄ | 4-N(CH₃)₂-C₆H₄ | 4-N(CH₃)₂-C₆H₄ | H | H | H | H | Cl | -CH₂CH₂- | ClO₄ |
| -4 | ″ | 4-Cl-C₆H₄ | ″ | 4-Cl-C₆H₄ | H | H | H | H | H | -CH₂CH₂- | ClO₄ |
| -5 | ″ | 4-NO₂-C₆H₄ | ″ | 4-NO₂-C₆H₄ | H | H | H | H | Cl | -CH₂CH₂- | ClO₄ |
| -6 | ″ | Ph | ″ | Ph | H | H | H | H | H | -CH₂CH₂CH₂- | ClO₄ |
| -7 | 4-OCH₃-C₆H₄ | ″ | 4-OCH₃-C₆H₄ | ″ | H | H | H | H | Br | -CH₂CH₂- | ClO₄ |

-continued

| Compound No. | A | B | D | E | $R_1$ | $R_2$ | $R_3$ | $R_4$ | $R_5$ | $R_6$ | $R_7$ | $X^\ominus$ |
|---|---|---|---|---|---|---|---|---|---|---|---|---|
| -8 | ⟨C₆H₄⟩– | ⟨C₆H₄⟩–Cl | ⟨C₆H₄⟩– | ⟨C₆H₄⟩–Cl | H | H | H | H | H | H | H | ClO₄ |
| -9 | " | " | " | " | H | H | H | H | H | ⟨C₆H₄(CH₃)⟩ (o-tolyl) | –(CH₂)₃– | p-CH₃-C₆H₄-SO₃ |
| -10 | ⟨C₆H₄⟩–N(C₂H₅)₂ | " | " | " | H | H | H | H | Cl | H | H | " |

Formula (II)

| Compound No. | A | B | D | E | $R_1$ | $R_2$ | $R_3$ | $R_4$ | $R_5$ | $R_6$ | $R_7$ | $X^\ominus$ |
|---|---|---|---|---|---|---|---|---|---|---|---|---|
| -1 | ⟨C₆H₄⟩–N(C₂H₅)₂ | ⟨C₆H₄⟩–N(C₂H₅)₂ | ⟨C₆H₄⟩– | ⟨C₆H₄⟩–Cl | H | H | H | H | Cl | H | H | p-CH₃-C₆H₄-SO₃ |
| -2 | " | " | ⟨C₆H₄⟩– | ⟨C₆H₄⟩– | H | H | H | H | Cl | H | H | ClO₄ |

| Compound No. | -C=CH—CH=N⊕ (Z₂) | -N-CH=CH-C (Z₁) | Z₃ | R₈ | R₉ | R₁₀ | l | X⊖ |
|---|---|---|---|---|---|---|---|---|
| Formula (III) | | | | | | | | |
| -1 | quinolinium | quinoline | neopentyl (C(CH₃)₂ with ethyls) | CH₃ | CH₃ | H | 0 | I |
| -2 | 5-methylbenzothiazolium, N-CH₃ | 5-methylbenzothiazoline, N-CH₃ | o-xylyl (benzene) | C₄H₉ | C₄H₉ | Cl | 0 | Cl |
| -3 | " | " | neopentyl | CH₃ | CH₃ | H | 1 | Cl |
| -4 | 3,3-dimethylindolinium | 3,3-dimethylindoline | " | C₂H₅ | C₂H₅ | H | 1 | I |
| -5 | 5-Cl-3,3-dimethylindolinium | 5-Cl-3,3-dimethylindoline | " | C₂H₅ | C₂H₅ | H | 1 | I |
| -6 | 6-CH₃O-benzoxazolium, N-CH₃ | 6-CH₃O-benzoxazoline, N-CH₃ | -CH₂CH₂- | C₂H₅ | C₂H₅ | H | 1 | I |
| -7 | 3,3-dimethylbenz[e]indolinium | 3,3-dimethylbenz[e]indoline | -CH₂CH₂CH₂- | C₂H₅ | C₂H₅ | H | 1 | I |
| -8 | 3,3-dimethylindolinium | 3,3-dimethylindoline | " | C₂H₅ | C₂H₅ | Cl | 1 | I |
| -9 | 3,3-dimethylindolinium | 3,3-dimethylindoline | neopentyl | C₂H₅ | C₂H₅ | H | 1 | SO₃-C₆H₄-CH₃ |

-continued

| Compound No. | $-\overset{Z_2}{C}=CH-CH{\overline{m}}N^{\oplus}$ | $-N{\overset{Z_1}{(}CH}=CH{)_{\overline{n}}}C-$ | $Z_3$ | $R_8$ | $R_9$ | $R_{10}$ | $l$ | $X^{\ominus}$ |
|---|---|---|---|---|---|---|---|---|
| -10 | " | " | | $CH_3$ | $CH_3$ | Br | 1 | $SO_4{-}CH_3$ |
| -11 | " | " | " | $C_4H_9$ | $C_4H_9$ | H | 1 | $SO_4{-}C_2H_5$ |

| Compound No. | $-\overset{Z_2}{C}=CH-CH{\overline{m}}N^{\oplus}$ | $-N{\overset{Z_1}{(}CH}=CH{)_{\overline{n}}}C-$ | $R_8$ | $R_9$ | $R_{12}$ | $R_{11}$ | $l$ | $X^{\ominus}$ |
|---|---|---|---|---|---|---|---|---|
| Formula (IV) | | | | | | | | |
| -1 | benzothiazolium | benzothiazoline | $CH_3$ | $CH_3$ | H | H | 1 | I |
| -2 | benzoxazolium | benzoxazoline | $C_2H_5$ | $C_2H_5$ | H | H | 1 | Cl |
| -3 | 3,3-dimethylindolenium | 3,3-dimethylindoline | $CH_3$ | $CH_3$ | H | H | 1 | Cl |
| -4 | quinolinium | dihydroquinoline | $C_5H_7$ | $C_3H_7$ | H | H | 1 | Cl |
| -5 | 5-methoxybenzothiazolium | 5-methoxybenzothiazoline | $C_4H_9$ | $C_4H_9$ | H | H | 1 | Cl |
| -6 | 5-bromobenzoxazolium | 5-bromobenzoxazoline | $CH_3$ | $CH_3$ | H | H | 1 | I |
| -7 | 5-chloro-3,3-dimethylindolenium | 5-chloro-3,3-dimethylindoline | $CH_3$ | $CH_3$ | H | H | 1 | I |

-continued

| Compound No. | -C≡CH—CH₂⌝ₘN⊕ (Z₂) | -N⊢CH=CH⌝ₙC (Z₁) | R₈ | R₉ | R₁₂ | R₁₁ | l | X⊖ |
|---|---|---|---|---|---|---|---|---|
| -8 | | | CH₃ | CH₃ | H | H | 1 | I |
| -9 | | | C₂H₅ | C₂H₅ | H | H | 1 | SO₃—⟨⟩—CH₃ |
| -10 | | | C₃H₇ | C₃H₇ | H | H | 1 | C₂H₅—SO₄ |
| -11 | | | CH₃ | CH₃ | H | Cl | 1 | CH₃SO₄ |
| -12 | | | CH₃ | CH₃ | H | Cl | 0 | ClO₄ |

As the examples of metal complex anions constituting the other ion source used in the present invention, on the other hand, there can be enumerated transition metal complexes such, for instance, as those represented by the following formulas (XIV) to (XXIV). However, the present invention should not be limited to these alone.

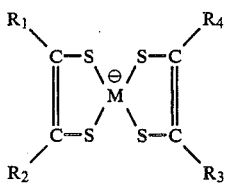
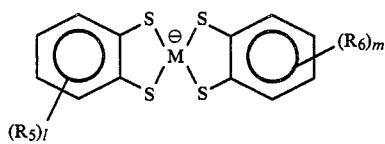
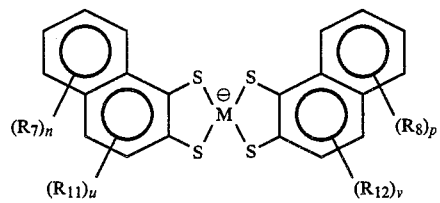
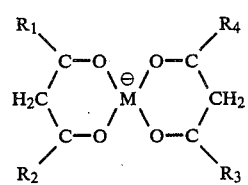

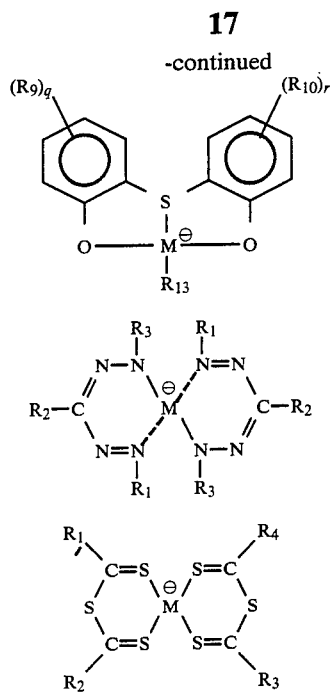

(XVIII)

(XIX)

(XX)

In the above formulas (XIV)–(XX), however, M stands for a transition metal such as Ni, Co, Mn, Cu, Pd, Pt or the like; $R_1$ to $R_4$ may be same or different and each stands for a substituted or unsubstituted alkyl, aryl or amino group; $R_5$ to $R_{12}$ may be same or different and each stands for a hydrogen atom, a halogen atom or a substituted or unsubstituted alkyl, acyl, alkoxy, acyloxy, aryl, alkenyl or amino group; $R_{13}$ stands for a substituted or unsubstituted amino group; l, m, n, p, q and r each stands for 0 or 1–4; and u and v each stands for 0 or 1–2.

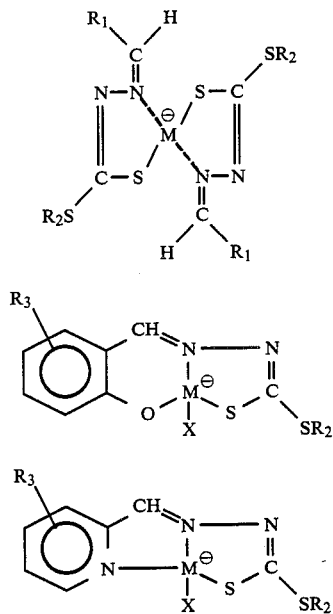

(XXI)

(XXII)

(XXIII)

In the above formulas (XXI)–(XXIII), however, M stands for a transition metal such as Ni, Co, Mn, Cu, Pt, Pd or the like; $R_1$ stands for hydrogen, and alkyl group, a phenyl group or a naphthyl group, and said phenyl group and naphthyl group may have been substituted by an alkyl group, an alkoxy group, an amino group, an alkylcarbonyl group, a phenylcarbonyl group or halogen; $R_2$ stands for hydrogen or an alkyl group; and $R_3$ stands for hydrogen, an alkyl group, an alkoxy group, halogen or an amino group.

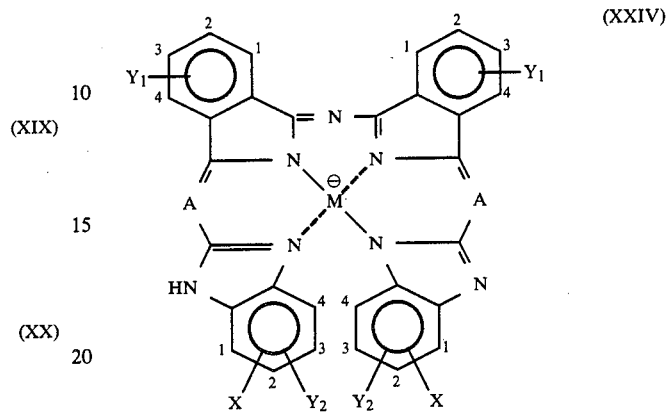

(XXIV)

In the above formula, M stands for a transition metal such as Ni, Co, Mn, Cu, Pt, Pd or the like; A stands for N or =CH—CH=N—; X stands for hydrogen, halogen, $C_1$–$C_6$ alkyl group or an amino group; and $Y_1$ and $Y_2$ may be same or different, and each stands for hydrogen, halogen, an alkyl group, a nitro group, $C_1$–$C_6$ alkoxysulfonyl group, $C_1$–$C_6$ alkylsulfonyl group, a carbamoyl group, $C_2$–$C_6$ alkylcarbamoyl group, $C_2$–$C_6$ alkoxycarbamoyl group, $C_7$–$C_{11}$ allylcarbamoyl group or $C_7$–$C_{11}$ allyloxycarbonyl group.

The counter ions against the above mentioned metal complex anions include cations such, for instance, as quaternary ammonium ions, ions substituted by P atoms for N atoms in said quaternary ammonium ions, ions substituted by As atoms for N atoms in said quaternary ammonium ions, and the like.

In preparing the double salts of the present invention, the compounds as shown below may be used for the purpose of providing the other ion source (metal complex anions).

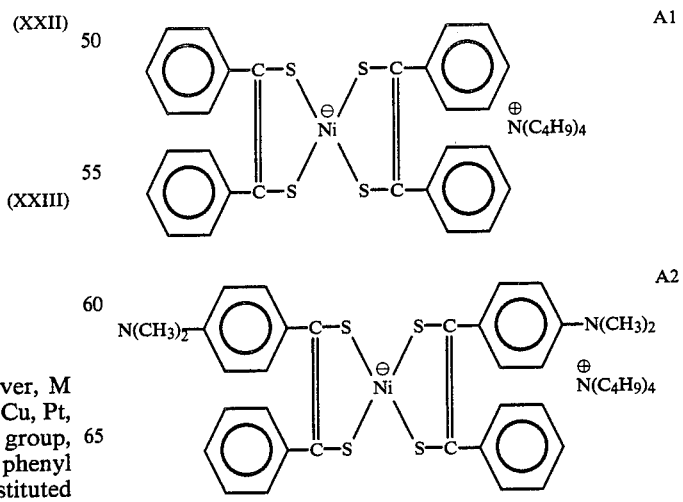

A1

A2

-continued

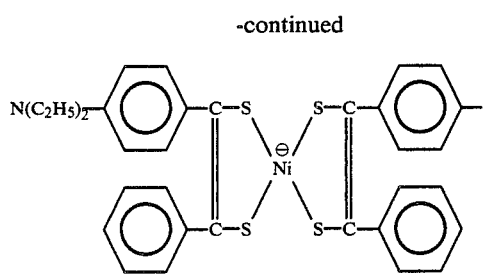 A3

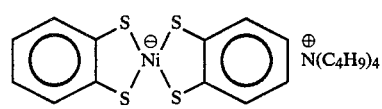 A4

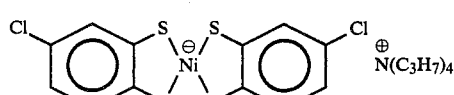 A5

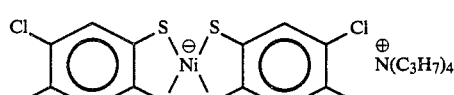 A6

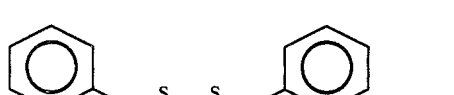 A7

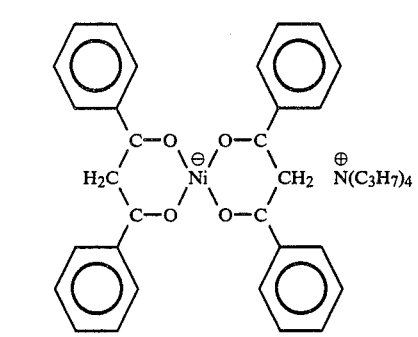 A8

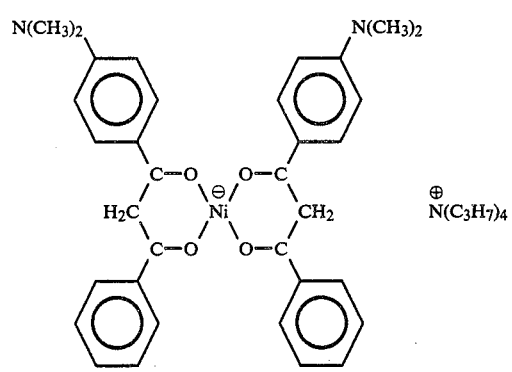 A9

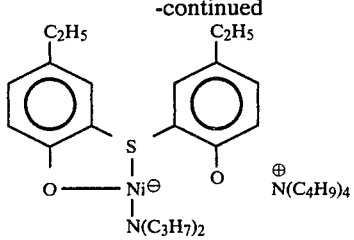 A10

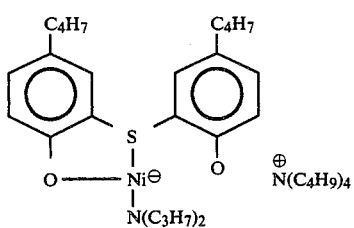 A11

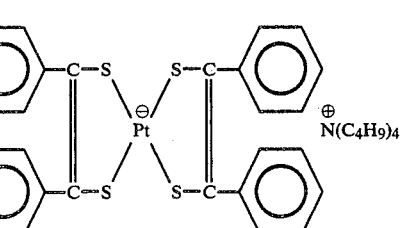 A12

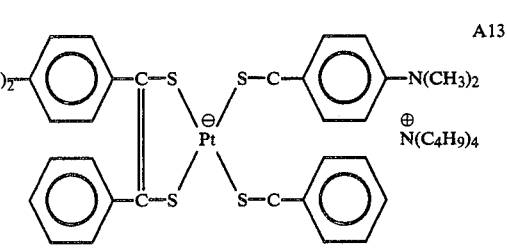 A13

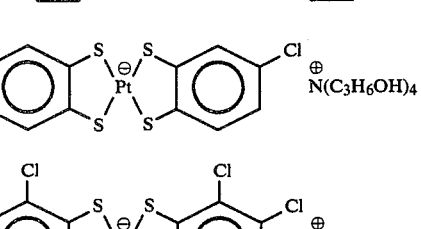 A14

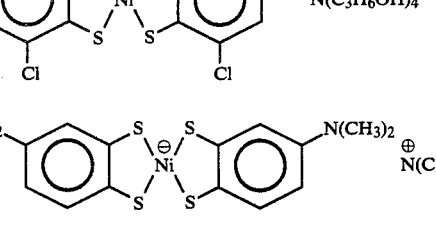 A15

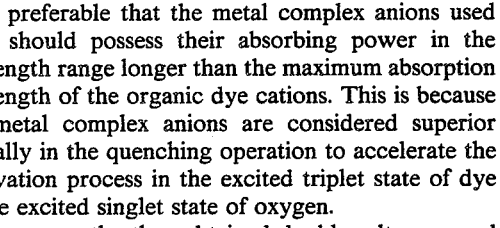 A16

It is preferable that the metal complex anions used herein should possess their absorbing power in the wavelength range longer than the maximum absorption wavelength of the organic dye cations. This is because such metal complex anions are considered superior especially in the quenching operation to accelerate the deactivation process in the excited triplet state of dye and the excited singlet state of oxygen.

In any case, the thus obtained double salts are used singly or in combination with two or more. The ratio of the organic dye cation to the metal complex anion contained in the double salt of the present invention is stoichiometrical as can be seen from the above explanation.

Next, as the organic dyes used in the recording layer (2) there can be enumerated those having the dye cations shown previously, namely polymethine dyes, triarylmethane dyes, pyrylium dyes, phenanthrene dyes, tetrahydrocholine dyes and triarylamine dyes, and further there can be used phthaloycanine dyes, dioxane dyes, triphenothiazine dyes, anthraquinone dyes, indanthrene dyes, xanthene dyes, croconium dyes, azulene dyes and the like. These organic dyes are used singly or in combination with two or more. The recording layer (2) containing organic dyes is more profitable than the recording layer (1) free from the organic dyes in that the absorptivity and reflectivity are enhanced and consequently the contrast and sensitivity are improved.

The ratio of the double salt to the organic dye is normally in the range of 5:95-98:2, preferably 10:90-95:5 (by weight).

The recording layer (1) or (2) of the present invention may be added with metal complexes having the above mentioned metal complex anions as stabilizers against heat and light. For the purpose of improving various characteristics of the recording layer, furthermore, it may be added with high molecular or low molecular binders (for instance, ionomer resin; polyamide resin; vinyl resins such as acrylic resin, styrene resin, vinyl acetate resin, polyvinyl butyral and the like; natural resins such as rosin, dammar, copal, celluloses, petroleum resin, polyglutamic acid resin and the like; silicone; liquid rubbers such as polychloroprene, polyisoprene, butyl rubber, polysulfide, polyisobutylene, styrene-butadiene rubber, acrylonitrile-butadiene rubber and the like; silane coupling agents and the like) and normal additives such as dispersing agent, flame retarder, slip agent, antistatic agent, surface-active agent, plasticizer and the like. However, it is preferable for the present invention to elude the simultaneous use of binders and these additives.

The thickness of the recording layer is in the range of 100 Å–1 μm, preferably 200 Å–2000 Å, more preferably 400–1000 Å, when the binder (for instance, the above mentioned high molecular material) is not used simultaneously, and is in the range of 100 Å–5 μm, preferably 200 Å–1 μm when the binder is used simultaneously. The recording layer suitable for recording and regenerating purposes should have at least 15% of reflectivity from the substrate side.

Next, the construction of the optical information recording medium according to the present invention will be explained with reference to the drawings.

As shown in FIG. 1, the optical information recording medium according to the present invention basically comprises providing, on a substrate 1, a light-absorptive recording layer 2 containing the double salt of the present invention or said double salt and the organic dye. This recording medium may also be built-up into a double-layered construction by combining the recording layer as a light-absorptive layer with a light reflective layer in optional order of upper or lower. However, it is preferable for the present invention to lack the reflective layer. It is desirable that the recording layer should be formed by applying, on the substrate, a solution of double salt or a solution of a mixture of double salt and organic dye. The solution is coated according to usual coating methods such as spray, roller coating, dipping, spin coating and the like, preferably spin coating. As solvents there are used normal solvents such as alcohols, ketones, amides, sulfoxides, ethers, esters, aliphatic halogenated hydrocarbons, aromatic hydrocarbons and the like. The recording layer may be formed by means of vapordeposition, sputtering, CVD and the like.

The substrate 1 must be transparent to the laser beam used when writing record is effected from the substrate side, and has no necessity of being transparent thereto when writing record is effected from the recording layer side. As the substrate, there are normally usable glass; plastics such as polyester, polyamide, polyolefin, polycarbonate, epoxy resin, polyimide, acrylic resin (for instance, polymethylmethacrylate), polymethylpentene and the like; metals; and ceramics. Preferably, there should be used acrylic resin or polycarbonate. Any substrate may be employed which is used in the recording medium.

The optical information recording medium of the present invention can be constructed by providing the recording medium of FIG. 1 further with an undercoat layer 3 and/or a protective layer 4 as shown in FIG. 2 to FIG. 4. In this instance, the undercoat layer and/or the protective layer may contain the double salt according to the present invention. The undercoat layer or the protective layer may contain stabilizer, dispersing agent, flame retardant, slip agent, antistatic agent, surface-active agent, plasticizer and the like.

The undercoat layer 3 is used for the purposes of (a) improving the adhesive property, (b) providing the barrier to water, gas and the like, (c) improving the preservation stability of the recording layer, (d) improving the reflectivity, (e) protecting the substrate from the solvent, and (f) forming a pregroove and the like for guiding the laser beam. In order to achieve the purpose (a) there are used the aforesaid high molecular or low molecular binders, and in order to achieve the purposes (b) and (c) there are used the aforesaid high molecular binders and additionally inorganic compounds such, for instance, as $SiO_2$, $MgF_2$, SiO, $TiO_2$, ZnO, TiN, SiN and the like; metals or semi-metals such, for instance, as Zn, Cu, S, Ni, Cr, Ge, Se, Cd, Ag, Al and the like. In order to achieve the purpose (d) there are used metals such, for instance, as Al, Ag and the like or organic dye thin films having metallic luster such, for instance, as polymethine dye xanthene dye and the like. In order to achieve the purposes (e) and (f) these are used ultraviolet ray-curing resin (photopolymer), thermo-setting resin, thermoplastic resin and the like. The material for the undercoat layer desirably should be the same as that for the substrate. For instance, in case an acrylic resin plate is used as the substrate, an acrylic photopolymer is used for the undercoat layer. The thickness of the undercoat layer is 0.1–30 μm, preferably 0.2–10 μm. In case the undercoat layer is not formed, the pregroove and the like may be formed directly in the substrate.

The protective layer 4 is provided for the purposes of protecting the recording layer from scratch, dust, dirt and the like and improving the chemical stability of the recording layer. As the material therefor is used the same material as used for the undercoat layer. The thickness of the protective layer is 0.1 μm or more, preferably 50 μm or more.

Further, the optical information recording medium according to the present invention may take another construction, namely the so-called air sandwich construction which comprises using two recording mediums of the same construction as shown in FIG. 1 to FIG. 4 (one of which may be used as the substrate alone according to circumstances) and disposing those recording layers 2 inside and sealing up, or may take the so-called adhering sandwich construction (adhered construction) which comprises adhering those recording layers 2 through the protective layer 4.

As the laser beam source, there are used carbon dioxide gas laser, YAG laser He-Ne laser, semi-conductor laser, argon laser and the like. Among them, the semi-conductor laser, which wavelength is 750–850 nm, is preferably used from the viewpoints of small-sized apparatuses and absorption wavelengths of the dyes used.

In any case, the recording and regenerating processes used in the optical information recording medium of the present invention are carried out by radiation of laser beam onto the recording layer surface in the exactly same manner as usual.

The optical information recording medium of the present invention constructed as mentioned above can attain the following effects:

1. High sensitivity recording can be attained even by the use of a long wavelength laser (semi-conductor laser).

2. Good-shaped pits can be formed, resulting in a high C/N, and

3. A recording medium, which is high in stability to heat and light, superior in preservability and of little regenerative deterioration, can be obtained.

1 . . . substrate, 2 . . . recording layer,
3 . . . undercoat layer, 4 . . . protective layer, Curve a . . . absorption spectrum of double salt of the compound represented by the formula (1) and the compound represented by the formula (2)

Curve b . . . absorption spectrum of the compound represented by the formula (1)

Curve c . . . absorption spectrum of the compound represented by the formula (2)

DESCRIPTION OF THE PREFERRED EMBODIMENTS

The present invention will be explained with reference to the preparation example of double salt, examples and comparative examples given hereinafter. However, it is to be noted that the present invention should not be limited thereto.

Preparation example of double salt 1 g of a compound having an undermentioned formula (1) was dissolved in 80 ml of a 1:3 mixed solvent of acetone and ethyl alcohol to thereby prepare an acetone-ethyl alcohol solution. Then, 1.4 g of a compound having an under-mentioned formula (2) was dissolved in 100 ml of acetone to thereby prepare an acetone solution. This solution was poured in said acetone-ethyl alcohol solution gradually on stirring. This mixture was concentrated by means of an evaporator, and then cooled in a refrigerator for crystal separation. This crystal was washed several times with a 1:4 mixed solvent of acetone and ethyl alcohol to obtain a pure double salt.

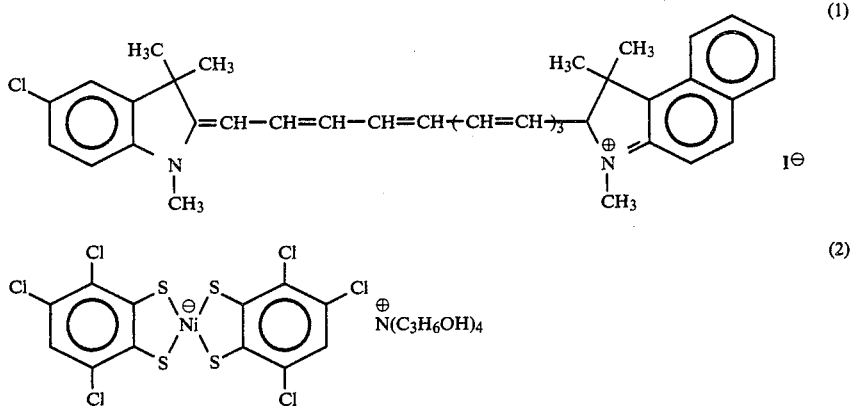

Figure 1:
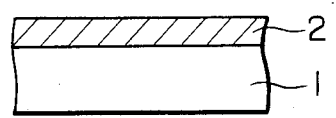
FIG. 1 to FIG. 4 each is a sectional view illustrating the construction of the optical information recording medium according to the present invention.
Figure 2:
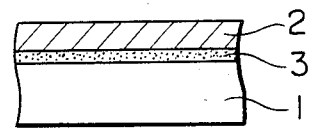
Figure 3:
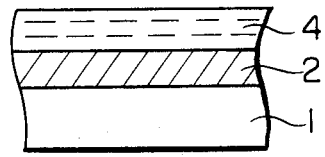
Figure 4:
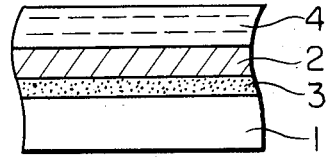
Figure 5:
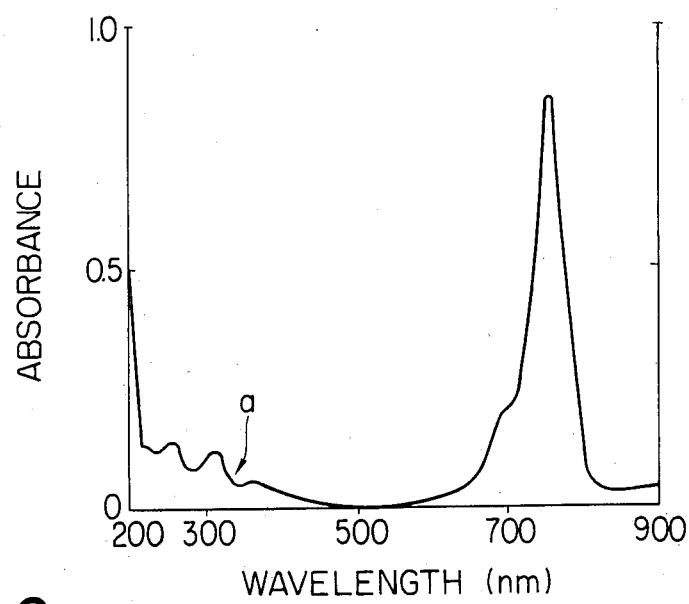
FIG. 5 illustrates a visible UV absorption spectrum of the double salt of the compound represented by the formula (1) and the compound represented by the formula (2) prepared according to the preparation example of double salt of the present invention.
Figure 6:
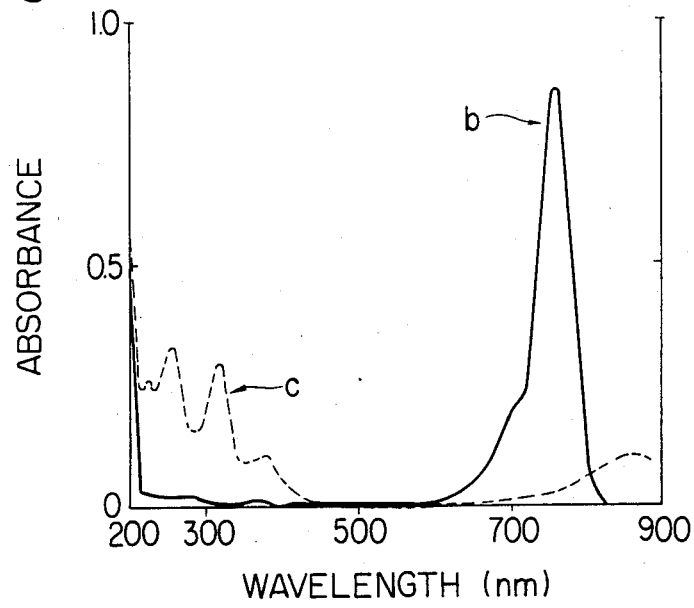
FIG. 6 illustrates a visible UV absorption spectrum of each of said compounds represented by the formulas (1) and (2).

The thus obtained double salt was subjected to a thin layer chromatograph to detect only a single spot having a Rf value which is different from those of the compounds (1) and (2). A visible UV absorption spectrum of a 1,2-dichloroethane solution of the thus obtained double salt crystal is shown in FIG. 5 (wherein, Curve a is an absorption spectrum of said double salt crystal). An absorption spectrum of each of the compounds having the formulas (1) and (2) is shown in FIG. 6 (wherein, Curve b and Curve c denote absorption spectrums of the compounds having the formulas (1) and (2) respectively.). When comparing FIG. 5 with FIG. 6, it is evident that the resulting crystal shows an inherent absorption in the double salt. When considering this fact together with the previous result obtained from the thin layer chromatograph, this crystal was identified to be a double salt of the organic dye cation and a metal complex anion.

EXAMPLES 1–12

A 0.75% 1,2-dichloroethane solution of each double salt comprising the organic dye cation and the metal complex anion shown in the following table-1 was prepared. Next, each solution was coated on a 1.2 mm-thick polymethylmethacrylate (which is called "PMMA" in short hereinafter) substrate by spin-coating to thereby form a recording layer having a thickness of about 500 Å. Thus, an optical information recording medium was prepared.

EXAMPLES 13-15

A 100 Å-thick silver film was vapor-deposited on a 1.2 mm-thick PMMA substrate, and a recording layer was formed thereon in the exactly same manner as each of Examples 1-3. Thus, an optical information recording medium was prepared respectively.

COMPARATIVE EXAMPLES 1-4

A 7.5% 1,2-dichloroethane solution of each compound comprising the organic dye cation and the counter anion $ClO_4^{\ominus}$ shown in the following table was prepared. Next, each solution was coated on a 1.2 mm-thick PMMA substrate by spin-coating to thereby form a recording layer having a thickness of about 500 Å. Thus, an optical information recording medium was prepared.

A semi-conductor laser beam (wavelength: 790 nm) was radiated onto each recording medium prepared in the above Examples and Comparative Examples from the substrate side under the conditions: writing power 2.25 mW, recording frequency 0.5 MHz and linear velocity 1.5 m/sec, to thereby write and regenerate the information. Said medium was subjected to spectral analysis (bandwidth of scanning filter: 30 KHz) to measure its C/N. Next, measurements were made of the reflectivity and C/N of the same recording medium which has been exposed to 50 hours' tungsten light radiation (54000 luxes). The reflectivity was measured from the substrate side. The results are summarized in the following Table-1.

TABLE 1

| Example No. | Dye cation | Metal complex anion | Initial value Reflectivity (%) | C/N (dB) | After 50 hours' radiation Reflectivity (%) | C/N (dB) |
|---|---|---|---|---|---|---|
| Example 1 | IV-1 | A12 | 24.2 | 52 | 17.6 | 46 |
| Example 2 | IV-7 | A3 | 24.7 | 54 | 22.4 | 52 |
| Example 3 | IV-8 | A15 | 25.1 | 53 | 23.0 | 51 |
| Example 4 | IV-12 | A7 | 21.3 | 49 | 19.8 | 45 |
| Example 5 | IV-7 | A15 | 24.4 | 53 | 22.1 | 51 |
| Example 6 | IV-8 | A1 | 24.9 | 54 | 22.2 | 51 |
| Example 7 | I-3 | A15 | 21.1 | 46 | 17.6 | 40 |
| Example 8 | III-5 | A15 | 24.2 | 52 | 22.2 | 47 |
| Example 9 | III-8 | A15 | 24.1 | 52 | 20.7 | 46 |
| Example 10 | I-10 | A3 | 21.0 | 46 | 18.7 | 42 |
| Example 11 | III-5 | A3 | 24.4 | 53 | 23.2 | 48 |
| Example 12 | III-8 | A3 | 23.9 | 52 | 21.1 | 47 |
| Example 13 | IV-1 | A12 | 35.1 | 52 | 33.1 | 43 |
| Example 14 | IV-7 | A3 | 35.7 | 54 | 32.8 | 50 |
| Example 15 | IV-8 | A15 | 35.5 | 53 | 33.4 | 51 |
| Comparative Example 1 | IV-1 | — | 28.7 | 57 | 8.9 | unmeasured |
| Comparative Example 2 | IV-7 | — | 29.2 | 58 | 11.2 | 28 |
| Comparative Example 3 | IV-8 | — | 31.2 | 58 | 13.1 | 31 |
| Comparative Example 4 | IV-12 | — | 24.5 | 53 | 13.0 | 31 |

Further investigations were made in the effects of the case where the previously prepared double salt was incorporated in the recording layer as in the present invention (which will be called "double salt system" hereinafter) and the case where the organic dye compound and the metal complex were separately incorporated in the recording layer (which will be called "mixing system" hereinafter).

The 0.75 wt% 1,2-dichloroethane solution of the double salt prepared according to the above preparation example was spin-coated on a PMMA substrate to thereby form a 600 Å-thick thin film. Thus, the sample of the present invention was prepared. For the purpose of comparison, on the other hand, a 1,2-dichloroethane solution prepared by mixing the compound having the formula (1) and the compound having the formula (2) used in the above preparation example in the weight ratio of 1:1, was spin-coated on a PMMA substrate to thereby form a 600 Å-thick thin film. Thus, the comparative sample was prepared. The thus prepared samples were each subjected to visible absorption spectral analysis to find that the double salt system sample of the present invention was about 10% higher in both absorption and reflection under the wavelength of 790 nm as compared with the mixing system comparative sample.

Still further, recording characteristics were investigated of the recording medium using the above double salt system recording layer of the present invention and the recording medium using the above mixing system recording layer. The obtained results are as shown below.

| | Initial value Reflectivity (%) | C/N (dB) | After 50 hours' radiation of tungsten light having 54000 luxes Reflectivity (%) | C/N (dB) | After 3000 hours' storage under conditions: 60° C., R.H. 90% Reflectivity (%) | C/N (dB) |
|---|---|---|---|---|---|---|
| Double salt system | 27.1 | 53 | 22.8 | 46 | 21.7 | 49 |
| Mixing system | 25.1 | 51 | 20.3 | 42 | 18.8 | 42 |

It is evident from the above results that the double salt system of the present invention is superior in both raw preservability and regenerative stability as compared with the mixing system. It is considerable the reason therefor consists in that the double salt system of the present invention is more powerful and stable in the interaction between the dye cation and the metal complex anion in the film forming state than the mixing system, and that the presence of useless counter ions, which accelerate the deterioration of the recording layer, in the recording layer can not be observed in the case of the double salt system of the present invention as compared with the mixing system.

EXAMPLES 13-24

A 0.75% 1,2-dichloroethane solution of each mixture prepared by admixing each double salt comprising the organic dye cation and the metal complex anion shown in the following table with the organic dye having the following formula (3) in the weight ratio of 1:1 was prepared. Next, each solution was spin-coated on a 1.2 mm-thick polyethylmethacrylate substrate, thereby forming a recording layer having a thickness of about 500 Å. Thus, an optical information recording medium was prepared.

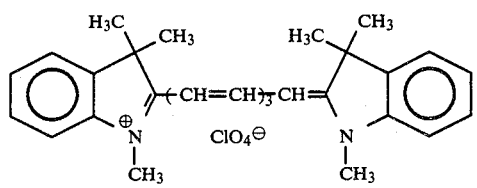

(3)

EXAMPLES 25-27

A 100 Å-thick silver vapordeposited film was formed on a 1.2 mm-thick PMMA substrate, and a recording layer was provided thereon according to the same procedure as each of Examples 19-21. Thus, an optical information recording medium was prepared.

EXAMPLES 28-30

A 1,2-dichloroethane solution obtained by admixing each double salt used in Examples 19-21 with a compound having the following formula (4) in the weight ratio of 7:3 was each spin-coated on a 1.2 mm-thick PMMA substrate to thereby form a recording layer having a thickness of about 400 Å. A compound having the following formula (5) was vapordeposited further thereon so as to have a thickness of about 150 Å. Thus, an optical information recording medium was prepared.

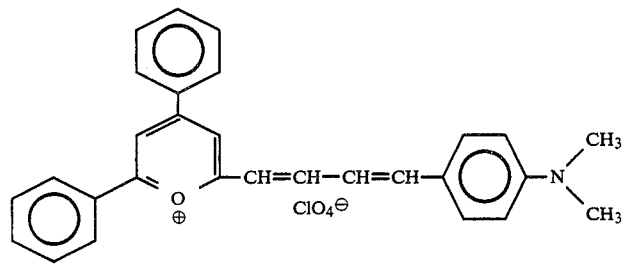

(4)

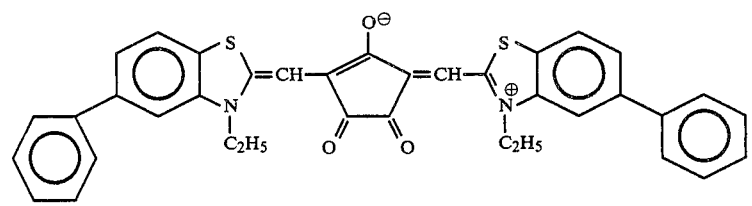

(5)

Next, the C/N and reflectivity of the recording mediums prepared by Examples 13-30 were measured according to the same procedures as Examples 1-12 respectively. The obtained results are shown in the following Table-2 together with data of Comparative Examples 1-4.

TABLE 2

| Example No. | Dye cation | Metal complex anion | Initial value Reflectivity (%) | C/N (dB) | After 50 hours' radiation Reflectivity (%) | C/N (dB) |
|---|---|---|---|---|---|---|
| Example 13 | I-3 | A-1 | 23.8 | 48 | 16.2 | 40 |
| Example 14 | IV-3 | A-1 | 26.8 | 55 | 21.9 | 50 |
| Example 15 | III-2 | A-4 | 26.5 | 54 | 18.8 | 48 |
| Example 16 | IV-12 | A-4 | 22.1 | 53 | 19.2 | 49 |
| Example 17 | III-5 | A-15 | 27.2 | 55 | 22.3 | 51 |
| Example 18 | IV-7 | A-15 | 27.7 | 56 | 22.8 | 52 |
| Example 19 | IV-1 | A-12 | 26.3 | 54 | 18.9 | 49 |
| Example 20 | IV-7 | A-3 | 26.9 | 56 | 23.1 | 53 |
| Example 21 | IV-8 | A-15 | 28.0 | 56 | 23.3 | 53 |
| Example 22 | IV-12 | A-7 | 27.1 | 55 | 22.7 | 52 |
| Example 23 | IV-7 | A-15 | 28.3 | 56 | 22.2 | 52 |
| Example 24 | IV-8 | A-1 | 23.0 | 57 | 23.1 | 53 |
| Example 25 | IV-1 | A-12 | 36.2 | 51 | 33.4 | 44 |
| Example 26 | IV-7 | A-3 | 36.6 | 52 | 34.2 | 48 |
| Example 27 | IV-8 | A-15 | 35.9 | 52 | 35.1 | 48 |
| Example 28 | IV-1 | A-7 | 26.9 | 53 | 16.9 | 42 |
| Example 29 | IV-7 | A-3 | 27.4 | 54 | 25.1 | 46 |
| Example 30 | IV-8 | A-15 | 27.8 | 54 | 25.2 | 45 |
| Comparative Example 1 | IV-1 | — | 28.7 | 57 | 8.9 | unmeasured |
| Comparative Example 2 | IV-7 | — | 29.2 | 58 | 11.2 | 28 |
| Comparative Example 3 | IV-8 | — | 31.2 | 58 | 13.1 | 31 |
| Comparative Example 4 | IV-12 | — | 24.5 | 53 | 13.0 | 31 |

Next, the recording medium of the present invention having the recording layer (double salt system) which contains the double salt obtained by the above preparation example and the cyanine dye having the formula (1) used in the above preparation example in the weight ratio of 1:1, and the recording medium having the recording layer (mixing system) which comprises admixing the cyanine dye having the formula (1) used in the above preparation example with the metal complex having the formula (2) used in the above preparation example in the weight ratio of 3:1 were investigated in recording characteristics, thereby obtaining the results as shown below.

| | Initial value Reflectivity (%) | C/N (dB) | After 50 hours' radiation of tungsten light (54000 luxes) Reflectivity (%) | C/N (dB) | After 3000 hours' storage under conditions: 60° C. R.H. 90% Reflectivity (%) | C/N (dB) |
|---|---|---|---|---|---|---|
| Double | 28.8 | 56 | 20.7 | 46 | 20.2 | 46 |

| | Initial value | | After 50 hours' radiation of tungsten light (54000 luxes) | | After 3000 hours' storage under conditions: 60° C. R.H. 90% | |
|---|---|---|---|---|---|---|
| | Reflectivity (%) | C/N (dB) | Reflectivity (%) | C/N (dB) | Reflectivity (%) | C/N (dB) |
| salt system Mixing system | 28.2 | 56 | 18.9 | 42 | 17.6 | 40 |

It is apparent from the above mentioned results that the double salt system of the present invention is superior in the raw preservability and regenerative stability as compared with the mixing system. The reason is as stated previously.

What is claimed is:

1. An optical information recording medium capable of recording information and regenerating the information with light comprising, on a substrate, a recording layer consisting essentially of a double salt of an organic dye cation and a metal complex anion, said recording layer having a thickness 100 Å to 5 microns.

2. A recording medium according to claim 1, wherein said organic dye cation is selected from the group consisting of polymethine dye cation, triaryl methane dye cation, pyrylium dye cation, phenanthrene dye cation, tetrahydrocholine dye cation and triarylamine dye cation, and said metal complex anion is a transition metal complex anion.

3. A recording medium according to claim 2, wherein the organic dye cation is a polymethine dye cation.

4. A recording medium according to claim 3, wherein said polymethine dye cation is of indolenine type.

5. A recording medium according to claim 1, wherein the metal complex anion has its absorbing power in the wavelength range longer than the maximum absorption wavelength of the organic dye cation.

6. A recording medium according to claim 1, wherein the thickness of the recording layer is in the range of 100 Å–1 μm.

7. A recording medium according to claim 6, wherein the thickness of the recording layer is in the range of 200–2000 Å.

8. A recording medium according to claim 7, wherein the thickness of the recording layer is in the range of 400–1000 Å.

9. A recording medium according to claim 1, wherein the recording layer contains no binder.

10. A recording medium according to claim 1, wherein the reflectivity of the recording layer from the substrate is at least 15%.

11. A recording medium according to claim 1, wherein the recording layer is formed by a coating method.

12. A recording medium according to claim 11, wherein said coating method is spin coating.

13. A recording medium according to claim 1, wherein the substrate is selected from the group consisting of an acrylic resin plate and a polycarbonate plate.

14. A recording medium according to claim 1, wherein a protective layer is provided on the recording layer.

15. A recording medium according to claim 1, wherein an undercoat layer is provided between the substrate and the recording layer.

16. A recording medium according to claim 15, wherein said undercoat layer is formed of the same kind material as that for the substrate.

17. An optical information recording medium capable of recording information and regenerating the information with light comprising, on a substrate, a recording layer consisting essentially of a double salt of an organic dye cation and a metal complex anion and an organic dye, said recording layer having a thickness 100 Å to 5 microns.

18. A recording medium according to claim 17, wherein said organic dye cation is selected from the group consisting of polymethine dye cation, triarylmethane dye cation, pyrylium dye cation, phenanthrene dye cation, tetrahydrocholine dye cation and triarylamine dye cation; said metal complex anion is a transition metal complex anion; and said organic dye is selected from the group consisting of polymethine dye, triarylmethane dye, pyrylium dye, phenanthrene dye, tetrahydrocholine dye, triarylamine dye, phthalocyanine dye, dioxane dye, triphenothiazine dye, anthraquinone dye, indanthrene dye xanthene dye, croconium dye and azulene dye.

19. A recording medium according to claim 18, wherein the organic dye cation is a polymethine dye cation.

20. A recording medium according to claim 19, wherein said polymethine dye cation is of indolenine type.

21. A recording medium according to claim 17, wherein the metal complex anion has its absorbing power in the wavelength range longer than the maximum absorption wavelength of the organic dye cation.

22. A recording medium according to claim 17, wherein the thickness of the recording layer is in the range of 100 Å–1 μm.

23. A recording medium according to claim 22, wherein the thickness of the recording layer is in the range of 200–2000 Å.

24. A recording medium according to claim 23, wherein the thickness of the recording layer is in the range of 400–1000 Å.

25. A recording medium according to claim 17, wherein the reflectivity of the recording layer from the substrate side is at least 15%.

26. A recording medium according to claim 17, wherein the recording layer is formed by a coating method.

27. A recording medium according to claim 26, wherein said coating method is spin-coating.

28. A recording medium according to claim 17, wherein the substrate is selected from the group consisting of an acrylic resin plate and a polycarbonate plate.

29. A recording medium according to claim 17, wherein a protective layer is provided on the recording layer.

30. A recording medium according to claim 17, wherein an undercoat layer is provided between the substrate and the recording layer.

31. A recording medium according to claim 30, wherein said undercoat layer is formed of the same material as that for the substrate.

* * * * *

Notice of Adverse Decisions in Interference

In Interference No. 102,625, involving Patent No. 4,626,496, T. Sato, OPTICAL INFORMATION RECORDING MEDIUM, final judgment adverse to the patentee was rendered Oct. 11, 1991, as to claims 1-31.

*(Official Gazette December 24, 1991).*